> United States Patent Office 3,433,510
Patented Mar. 18, 1969

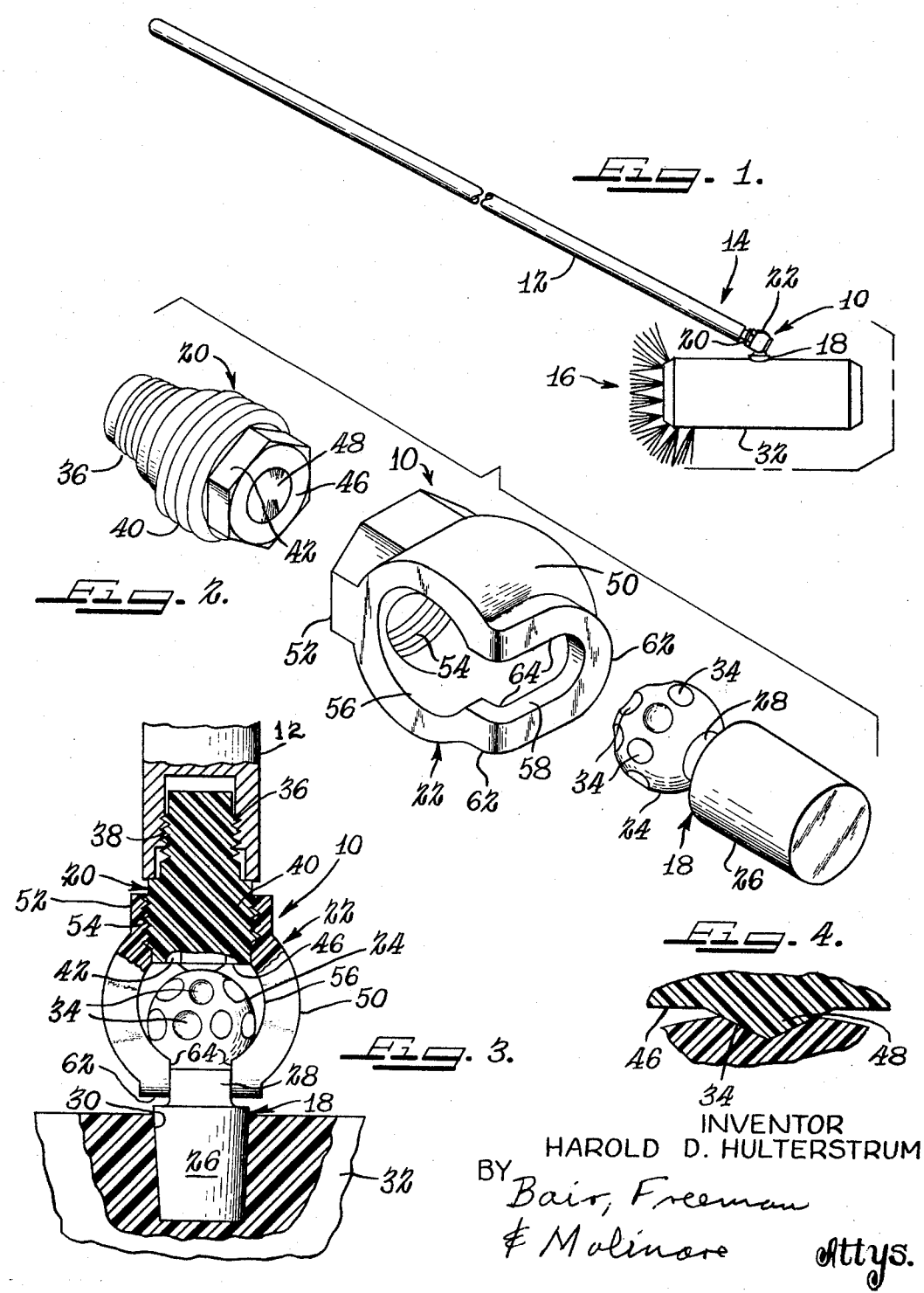

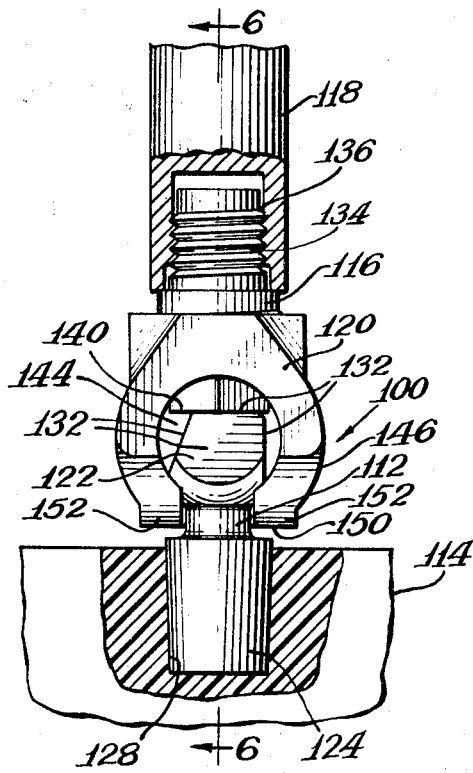
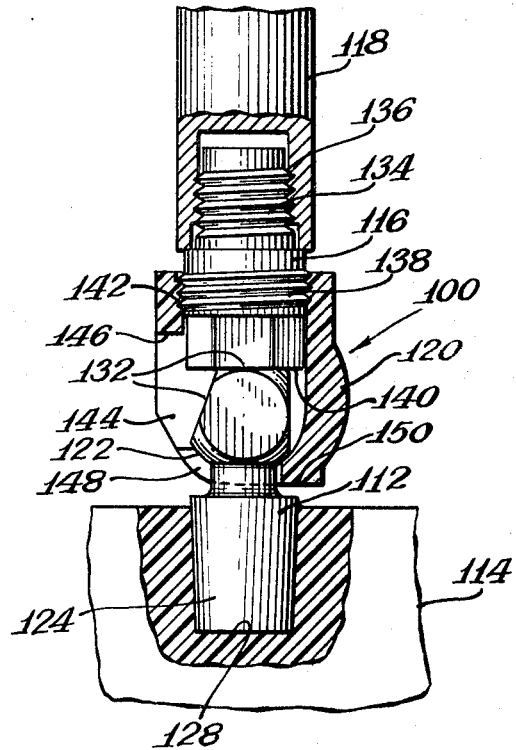
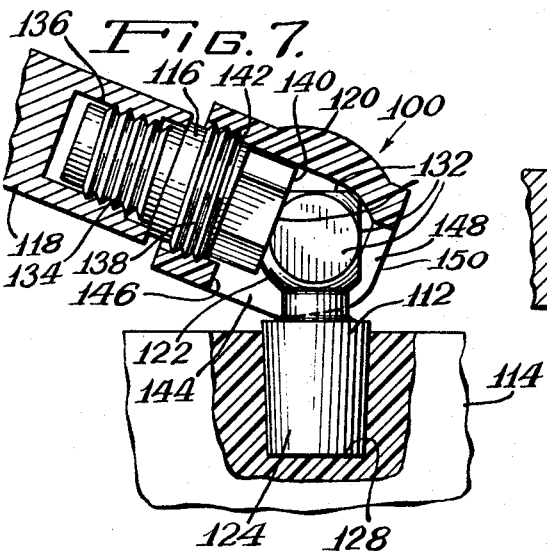
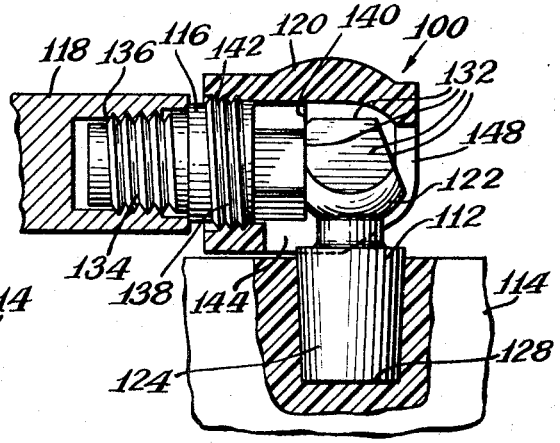
Inventor:
Harold D. Hulterstrum
By Bair, Freeman
& Molinare   Attys.

3,433,510
SWIVEL JOINT STRUCTURE
Harold D. Hulterstrum, Baraboo, Wis., assignor to Flambeau Plastics Corporation, a corporation of Wisconsin
Continuation-in-part of application Ser. No. 489,505, Sept. 23, 1965. This application Sept. 26, 1966, Ser. No. 581,811
U.S. Cl. 287—12     3 Claims
Int. Cl. F16c *11/06;* F16l *27/02;* B25g *3/38;* F16b *7/00*

ABSTRACT OF THE DISCLOSURE

A swivel structure for rigidly joining first and second parts together. A first member is connected to the first part and a second member is connected to the second part. An intermediate hollow member interconnects the first and second members together. An enlarged outer end portion is provided on the first member and includes a plurality of locking means thereon. Means are provided on the second member for engaging one of the locking means. Means are provided for threadably joining the hollow member and the second member together. A slot is provided in the hollow member and includes an enlarged entrance which passes the enlarged outer end portion and which also includes a restricted opening opposite the threaded joining of the hollow member and the second member together. The portion surrounding the restricted opening opposes the forces imparted against the outer end portion as the second member is threadably joined to the hollow portion and bears against the outer end portion.

---

This application is a continuation-in-part of my application Ser. No. 489,505, filed Sept. 23, 1965 and now abandoned.

This invention relates to an improved swivel structure and it particularly relates to a swivel structure which is particularly useful for rigidly joining first and second parts together at one of a variety of relative orientations.

Known swivel structure devices for joining parts together may be used for many purposes. As an example, a swivel structure may be used for connecting the bristle portion of a brush to a handle portion so that the relative orientation between the handle and the brush or bristle portion may be varied, depending upon the particular use to which the brush is placed. The relative orientation between the brush portion and the handle portion may be desirably in one position when the brush is used for cleaning a vertical surface, as the side of a car, whereas the brush portion may be more effective at a different orientation relative to the handle when used for cleaning a horizontal surface, as a car roof. Known swivel structures have certain disadvantages and are not highly useful for a variety of purposes. These disadvantages include a failure to provide a truly rigid connection between joined parts, a failure to provide sufficient adjustability so that there is a wide range of possible orientations between joined parts, and a failure to provide a highly economical and simply constructed device.

It is therefore an important object of this invention to provide an improved swivel structure which substantially overcomes certain of the disadvantages of the prior art constructions.

It is also an object of this invention to provide an improved swivel structure which provides a highly rigid connection between parts connected by a swivel structure.

It is a further object of this invention to provide a swivel structure which enables the joined parts to be rigidly interconnected in a wide range of possible relative orientations.

It is still a further important object of this invention to provide an improved swivel structure which is characterized by its simplicity and economy of construction, manufacture, and use.

Further purposes and objects of this invention will appear as the specification proceeds.

The foregoing objections are accomplished by providing a swivel structure for rigidly joining first and second parts together at a selected orientation wherein said structure comprises a first member connected to said first part, a second member connected to said second part, an intermediate substantially hollow member interconnecting said first and second members and thereby said first and second parts together, an elongated outer end portion on said first member, a plurality of locking means on said outer end portion, a neck portion on said first member and being adjacent said enlarged outer end portion, means on said second member for engaging a selected one of said locking means, means for threadably and adjustably joining said hollow member and said second member together, a slotted portion on said hollow member including an enlarged entrance for passing said enlarged outer end portion therethrough, and said slotted portion also including a restricted opening opposite said threadable joining means for slidably receiving said neck portion, flange portions defining said neck portion and opposing the forces imparted as said second member is threadably joined to said hollow portion, said outer end portion being interposed between said restricted opening and said engaging means.

Particular embodiments of the present invention are illustrated in the accompanying drawings wherein:

FIGURE 1 is a side elevational view of an improved swivel structure for interconnecting the brush portion of a brush construction to a handle portion;

FIGURE 2 is an exploded, perspective view of the three primary parts of my improved swivel structure;

FIGURE 3 is a fragmentary, partially sectioned transverse view of my swivel structure when utilized for connecting the brush portion of a brush construction to a handle portion, such as shown in the embodiment of FIGURE 1;

FIGURE 4 is an enlarged sectional view of the projection on the tightening member of my swivel structure in engagement with a depression in the spherical surface of the elongated body portion of my device;

FIGURE 5 is a front elevational view, partially in section, of a preferred form of my swivel structure;

FIGURE 6 is a side sectional view of the embodiment of FIGURE 5 taken along the line 6—6 of FIGURE 5;

FIGURE 7 is a view similar to FIGURE 6, except that the parts joined by the swivel structure are shown at one selected orientation; and FIGURE 8 is a view similar to FIGURE 7, except that the joined parts are shown at another selected orientation.

Referring to the embodiment of FIGURES 1–4, my improved swivel structure 10 is shown providing a rigid interconnection between an elongated handle portion 12 of a brush structure 14 and the brush portion 16 thereof. The swivel structure 10 generally comprises three components of an elongated body 18 which is rigidly connected to the brush portion 16, a tightening member 20 which is rigidly connected to the handle 12, and a hollow member 22 which joins the elongated member 18 to the tightening member 20. For economy in the construction of the swivel structure 10, the component parts thereof are preferably constructed of rigid molded plastics, such as nylon.

The elongated body 18 of the swivel structure 10 includes a substantially spherical end portion 24, a tapered plug portion 26 for providing the desired connection with the brush portion 16, and a restricted neck portion 28 interposed between and interconnecting the spherical portion 24 to the tapered portion 26. Although many different methods may be utilized for joining the elongated body 18 of the structure 10 to the part to be joined thereto, in the present construction, the plug portion 26 is substantially frusto-conical in shape and is received within a similarly formed, mating aperture or well 30 provided in the support 32 of the brush portion 16. Since the support 32 is desirably constructed of a suitable plastic, such as molded nylon, the plug 26 may be joined to the support 32 by use of a suitable adhesive for rigidly joining mating plastic parts together. The spherical end portion 24 of the body 18 includes a plurality of spaced depressions 34 therein which permit the variable rigid positioning of the brush portion 16 with respect to the handle 12.

The tightening member 20 includes a threaded shank portion 36 which is threadably received within a threaded socket 38 provided in one end of the elongated handle 12. The tightening member 20 also includes a raised threaded portion 40 which is adjacent the threaded shank 36. The inner end 42 of the member 20 or the end opposite the threaded shank 36 is hexagonal in shape for receiving a wrench or the like for threadably securing the member 20 into the threaded socket 38 of the handle 12. The outer face 46 of the end 42 of the tightening member 20 includes an outwardly projecting, substantially conical projection 48 which is provided to engage in one of the depressions 34 of the spherical surface 24 of the elongated body 18.

The hollow member 22, which is utilized for interconnecting the tightening member 20 to the elongated body 18, is defined by an outer wall or shell 50 which forms the hollow interior thereof. The tightening member end 52 of the hollow member 22 includes an interiorly threaded aperture 54 for threadably receiving the threaded shank 36 of the tightening member 20 and thereby providing communication between the end 52 and the hollow interior of the member 22. The wall 50 of the hollow member 22 has an opening 56 defined therein for providing entrance or exit means for the spherical portion 24 of the elongated member 18 to or from the inside of the member 22. The aperture 56 is substantially transverse to the longitudinal axis of the hollow member and therefore is also transverse to the axis of the tightening member 20. A slotted portion 58 is provided adjacent the transverse aperture 56 and extends from the aperture 56 to the outer face 60 of the hollow member 22, at the elongated body end 62 thereof. The aperture 54 in combination with the slotted portion 58 defines a substantially L-shaped aperture in the outer wall 50 of the hollow member 22. The slotted portion 58 also completes a substantially axial opening through the hollow member 22, which extends from the tightening member end 52 to the elongated body end 62 thereof. The slotted portion 58 is restricted in width relative to the threaded aperture 54 and is provided with slot defining flanges 64, which receive the neck portion 28 of the elongated body 18 therein. The aperture 56 is sized to permit the entrance therein of the spherical portion 22 of the elongated body 18 while the slotted portion 58 is restricted so as to prevent the passage of the spherical portion 24 therethrough. The flanged slotted portion 58, however, permits the passage of the neck portion 28 therein so that the elongated body 18 may be moved substantially through at least a 90° angle.

Since the depressions 34 are radially positioned relative to the center of the spherical portion 24 and since the conical projection 48 on the face 46 of the tightening member 20 is coaxial therewith, upon insertion of the spherical portion 24 into the hollow member 22 through the aperture 56, the device provides for rigid interconnection of the body 18 to the tightening member 22. This is accomplished by firmly threading the tightening member into the hollow member 22, until the projection 40 securely engages one depression 34, in the manner shown in FIGURE 4. This tightening is completed after the desired orientation of the handle 12 to the brush portion 16 has been selected.

One of the important features of this invention is the provision of the flanged slotted portion 58 for opposing the tightening forces of the tightening member 20 upon securement to the hollow member 22 so as to prevent the disengagement of the spherical portion 24 of the body 18 from the interior of hollow member 22. This construction also provides a wide range of possible orientations of the elongated body member 18 to the tightening member. Before securement, the body 18 may be moved through at least 90° in the L-shaped aperture defined by the aperture 56 and slot 58. Also, the elongated body member 18 may be rotated, prior to securement, about its longitudinal axis through 360°. The described possible relative movements provide the desired wide range of possible orientation between the handle 12 and the brush portion 16.

Referring to FIGURES 5–8, there is shown a preferred embodiment 100 of my swivel structure. As with the first embodiment, the swivel structure 100 includes the three components of an elongated body 112 which is rigidly connected the brush portion 114, a tightening member 116 which is rigidly connected to a handle 118 and a hollow connecting member 120 which joins the elongated body 112 to the tightening member 116.

The elongated body 112 includes an outer end portion 122, a tapered plug portion 124 for providing the desired connection with the brush portion 114, and a restricted neck portion located between the outer end portion 122 and the plug portion 124. As with the first embodiment, the plug portion 124 is substantially frusto-conical in shape and is received within a similarly formed aperture or well 128 in the brush portion 114. The outer end portion rather than having depressions therein as with the first embodiment, has a plurality of intersecting faces or flat surfaces 132 at a variety of orientations. These faces 132 provide for the desired variation in the selected orientation of the brush portion 114 with respect to the handle portion 118.

The tightening member 116 includes a threaded shank 134 which is received within a threaded socket 136 in the handle 118. The tightening member 116 also includes a larger diameter threaded portion 138 adjacent the shank 134 but outwardly thereof. The outer face or end 140 of the tightening member 116 is flat and engages or bears against one of the faces 132 of the outer end portion 122 of the elongated body 112.

The hollow member 120 is substantialy the same constuction as the hollow member 22 of the first embodiment of FIGURES 1–4. Thus, the hollow member 120 includes a threaded aperture 142 for threadably receiving the threaded portion 138 of the tightening member 116. An opening 144 is defined in the outer wall 146 of the hollow connecting member 120 so as to provide for entrance or exit of the outer end portion 122 of the elongated body 112. The opening 144 is substantially transverse to the longitudinal axis of both the hollow member and the tightening member 116. A slotted portion 148 is provided adjacent the opening 144 and extends therefrom to the outer face 150 of the hollow connecting member 122. The opening 144 in combination with the slot 148 defines an L-shaped aperture in the outer wall 146. The slot 148 is provided with slot defining flanges 152 wherein the neck portion 126 of the elongated body 112 is received. The aperture 144 permits the entrance of the outer end portion 122 while the slot 148 with the flanges 152 is restricted so as to prevent the passage of the outer end portion 122 from within the hollow connecting member 120. The flanged slot 148 prevents the passage of the neck portion 126 therethrough so that the elongated body 112 may be moved through at least about a 90° angle.

In this embodiment, when the tightening member 116 is firmly secured to the connecting member 120, the flat outer end 140 bears against one of the faces 132 on the outer end portion 122 of the elongated body. Since the faces 132 are positioned at a variety of orientations, a user may select any of a variety of relative positions between one part, as the handle 118, and another part, as the brush portion 114. This embodiment thus provides an extremely rigid connection having great strength by the one flat surface bearing against another flat surface.

It is seen from the foregoing description that I have provided a highly useful swivel structure which may be utilized for rigidly interconnecting two parts, such as a brush portion and as a handle portion. The device is highly economical in construction and simple in use and may be utilized for locking relatively moving parts into any of a variety of selected orientations.

While in the foregoing there has been provided a detailed description of a particular embodiment of the present invention, it is to be understood that all equivalents obvious to those skilled in the art are to be included.

What I claim and desire to secure by Letters Patent is:

1. A swivel structure for rigidly joining first and second parts together at a selected orientation, said structure comprising a first member connected to said first part, a second member connected to said second part, an intermediate substantially hollow plastic member interconnecting said first and second members and thereby said first and second parts together, an enlarged outer end portion on said first member, a plurality of locking means on said outer end portion, a neck portion on said first member and being adjacent said enlarged outer end portion, means on said second member for engaging a selected one of said locking means, means for threadably and adjustably joining said hollow member and said second member together, a slotted portion on said hollow member including an enlarged transverse opening for passing said enlarged outer end portion therethrough, said slotted portion also including a restricted opening axially aligned with said threadable joining means for slidably receiving said neck portion, axial flange portions defining said restricted opening and opposing the forces imparted as said second member is threadably joined to said hollow portion, said enlarged outer end portion being interposed between said restricted opening and said engaging means.

2. The device of claim 1 wherein said locking means are depressions in said outer end portion, and said engaging means comprises a projection on said second member for engaging in said depressions.

3. The device of claim 1 wherein said locking means comprises a plurality of flat surfaces on said outer end portion, and said engaging means comprises a flat end portion for bearing against one of said flat surfaces.

References Cited

UNITED STATES PATENTS

| 649,234 | 5/1900 | Chiavaro. | |
|---|---|---|---|
| 1,124,073 | 1/1915 | Sullivan | 306—7 |
| 3,006,011 | 10/1961 | Littleton | 306—7 XR |
| 3,055,341 | 9/1962 | Riepe | 287—12 XR |
| 3,143,365 | 8/1964 | Egger | 287—12 |

FOREIGN PATENTS 611,386   7/1926   France.

CARL W. TOMLIN, *Primary Examiner.*

ANDREW KUNDRAT, *Assistant Examiner.*

U.S. Cl. X.R.

287—87; 306—9